3,036,059
LAKES OF MONOAZO DYESTUFFS
Klaus Ehrhardt and Fritz Kehrer, Basel, Switzerland, assignors to Sandoz A.G., Basel, Switzerland
No Drawing. Filed May 9, 1958, Ser. No. 734,105
Claims priority, application Switzerland May 16, 1957
7 Claims. (Cl. 260—149)

The present invention relates to color lakes of monoazo dyestuffs of the acylacetic acid amide series which contain one or two carboxylic acid and/or sulfonic acid groups which form lakes with divalent and multivalent metals, and apart from these groups and the enolizable —CO— group of the acylacetylamino radical, contain no water-solubilizing groups.

The process for the production of the new color lakes consists in treating monazo dyestuffs of the acylacetic acid amide series, which contain one or two water-solubilizing groups of the series of the carboxylic acid and/or sulfonic acid groups but no other water-solubilizing groups except the enolizable —CO— group of the acylacetylamino radical, with compounds of divalent or multivalent metals.

Particularly suitable for the production of the lakes are the monazo dyestuffs of the formula:

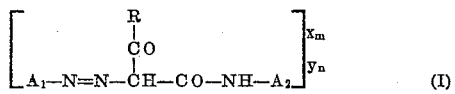

(I)

wherein $A_1$ and $A_2$ represent mono- or dinuclear aromatic radicals,
R alkyl or aryl,
x a carboxylic acid group,
y a sulfonic acid group, and
m and n each stand for one of the figures 0, 1 or 2, the sum of m and n being either 1 or 2.

These monoazo dyestuffs are produced by the known methods. The acylacetylamino compounds named as coupling components can be, for example, benzoylacetyl-aminobenzenes or -naphthalenes, or more especially acetoacetylaminobenzenes or -naphthalenes. The benzene nuclei of these compounds, which are adjacent to the —NH— groups, may be free of other substituents or may carry one or more further substituents, for example, low molecular alkyl or alkoxy groups such as methyl, ethyl, methoxy or ethoxy groups, halogen atoms such as bromine or chlorine, acetylamino or benzoylamino groups. The following are listed as examples:

Benzoylacetylaminobenzene, 1-benzoylacetylamino-2-, -3- or -4-methyl, -2-, -3- or -4-methoxy, -2-, -3- or -4-chlorobenzene, acetoacetylaminobenzene,
1-acetoacetylamino-2-chlorobenzene,
1-acetoacetylamino-2-methoxybenzene,
1-acetoacetylamino-4-methoxybenzene,
1-acetoacetylamino-2-methoxy-5-methylbenzene,
1-acetoacetylamino-2.4-dimethylbenzene,
1-acetoacetylamino-2.5-dimethoxybenzene,
1-acetoacetylamino-2-methoxy-4-chloro-5-methylbenzene,
1-acetoacetylamino-2-ethoxy-4-chloro-5-methylbenzene,
1-acetoacetylamino-2-methoxy-4-bromo-5-methylbenzene,
1-acetoacetylamino-2-ethoxy-4-bromo-5-methylbenzene,
1-acetoacetylamino-2-methoxy-4-acetylamino-5-chloro-benzene,
1-acetoacetylamino-2.5-dimethoxy-4-benzoylaminobenzene,
1-acetoacetylamino-2.5-dimethoxy - 4 - chlorobenzene and its sulfonic acid derivatives, and
1-acetacetylamino- or 1-benzoylacetylaminonaphthalene-2-, -4- or -8-sulfonic acid and 2-acetoacetylamino- or 2-benzoylacetylaminonaphthalene-1-, -5-, -6-, -7- or -8-sulfonic acid.

The following are examples of diazo components used for the production of the monoazo dyestuffs:

1-aminobenzene-2-, -3- or -4-carboxylic acid,
1-aminobenzene-2-, -3- or -4-sulfonic acid, 1-amino-4-methyl- or -4-methoxy or -4-chlorobenzene-2-sulfonic acid,
1-amino-4-methyl-5-chlorobenzene-2-sulfonic acid,
1-amino-4-chloro-5-methylbenzene-2-sulfonic acid,
1-amino-4.5-dichlorobenzene-2-sulfonic acid,
1-amino-2.5-dichlorobenzene-4-sulfonic acid,
1-amino-2-methoxy-5-methylbenzene-4-sulfonic acid,
1-amino-2.4-dimethyl-6-sulfonic acid,
1-aminonaphthalene-2-, -4- or -8-sulfonic acid, and 2-aminonaphthalene-1-, -5-, -6-, -7- or -8-sulfonic acid.

In the process as defined above the lakes are formed with the finished dyestuff. However, the coupling reaction giving the monoazo dyestuffs and their combination with metal salts to form lakes can be performed simultaneously. This mode of operation forms a further part of the present invention.

In principle all the soluble compounds of divalent and multivalent metals whose atomic weight exceeds 24 are suitable for the formation of the lakes. Special mention may be made of the compounds of alkaline earth metals, aluminum, manganese, iron, cobalt, nickel, copper, zinc, cadmium and lead. It is advantageous to employ water-soluble salts, either singly or in mixture with the salts of other divalent or multivalent metals, in amounts sufficient to combine with the carboxylic acid and/or sulfonic acid groups of the dyestuff to give the lake. It is advisable to employ an excess of the metal compound.

For conversion into lakes the above-defined monoazo dyestuffs are dissolved or suspended in water. As stated above, the lakes can also be formed in the coupling mixture in which the dyestuffs have been produced. When this latter procedure is followed the coupling mixture is adjusted to the optimum pH value, e.g. 6.5 to 7.5, and the solution of the metal compound or mixture of metal compounds is added. The treatment may be carried out at room temperature, but higher temperatures, for example 70° to 100° C. and above, are preferable. The choice of a suitable temperature is important, because it has an effect on the color and the fastness properties of the lake. After a short time the lake so formed is precipitated from the solution or suspension and filtered off.

If the mode of operation involving simultaneous coupling and lake formation is adopted, the coupling reaction is conducted in a medium rendered alkaline with a hydroxide of the metal used for laking and, if desired, an addition of an alkali metal hydroxide. Alternatively, the diazo solution or suspension can be mixed with the solution of the appropriate metal salt and the mixture then run into the solution or suspension of the coupling component preferably at temperatures below 20° C. Following this, the formed color lake is filtered off, or the mass is adjusted to a suitable pH-value, heated if desired and the formed color lake is filtered off.

The filter cakes, either in the moist state or after intermediate drying, are ground to bring them into a form suitable for further processing. Grinding is carried out to best effect in presence of a dispersing agent, binder or plasticizer.

To impart a soft texture to the lakes it is advantageous to employ interfacially active substances in their production, e.g. soap, alkylarylsulfonates, sulfonated fatty alcohols, rosin soap, and fat or oil emulsions. A suitable filler may also be included in the mass; examples are aluminum oxide, titanium dioxide, barium sulfate or lead sulfate.

The lakes of the monoazo dyestuffs which are obtained by the present process possess outstanding light fastness, good migration fastness in polyvinyl chloride in presence of plasticizers and good resistance to heat in polyvinyl chloride and other plastics; they are practically insoluble in the solvents used in the industry of lacker and prints; they are resistant to topcoating and are also suitable for stoving finishes, for the mass pigmentation of manufactured fibers and for dyeing paper furnishes in the beater, printing textiles, leather and paper, and coloring synthetic resins, plastic molding compounds, and paint and lacquer media.

In the examples which follow the parts and percentages are by weight and the temperatures are given in degrees centigrade.

Example 1

The filter cake of the monoazo dyestuff which is obtained by coupling the diazo compound of 22.1 parts of 1-amino-5-methyl-4-chlorobenzene-2-sulfonic acid with 20.7 parts of 1-acetoacetylamino-2-methoxybenzene is mixed with 3000 parts of water. The suspension is neutralized and after heating to 80° a solution of 9 parts of anhydrous calcium chloride in 500 parts of water at 80° is added in the course of about 15 minutes. The whole is maintained at 80° for 1 hour, after which the lake is filtered off and dried in vacuo at 60°.

The lake dyes polyvinyl chloride in the mass a greenish yellow.

If conditions different from the above are employed, e.g. lower or higher temperature and/or different pH values, the resultant lakes are similar to that of the above example but may show slight deviations of shade.

The monoazo dyestuffs are produced in the following way: 22.1 parts of 1-amino-5-methyl-4-chlorobenzene-2-sulfonic acid are dissolved in 500 parts of water with the aid of 15 parts of 30% caustic soda. After filtering off the undissolved substance, a solution of 6.9 parts of sodium nitrite in 100 parts of water is added. The resultant mixture is dropped at 5–6° over a period of 30 minutes into a mixture of 25 parts of 36% hydrochloric acid and 100 parts of water. After this time the mass is stirred for 2 hours at 5–6°.

Meanwhile 20.7 parts of 1-acetoacetylamino-2-methoxybenzene are dissolved in 200 parts of water and 15 parts of 30% caustic soda. The undissolved substance is filtered off and a solution of 50 parts of crystallized sodium acetate in 75 parts of water is added to the filtrate, followed by sufficient 10% acetic acid to cause the mixture to react weakly acid to litmus paper.

In the course of 30 minutes the diazo suspension at 20–30° is run into the solution of the coupling component and kept in constant agitation overnight. On the following day the monoazo dyestuff formed is filtered off at 60° and washed with water.

The procedure for dyeing polyvinyl chloride in the mass is as follows.

0.1 part of the pigment dyestuff described in the present example is wetted out with 1 part of dioctyl phthalate and pasted with a spatula. 100 parts of a previously prepared mixture of 60 parts of polyvinyl chloride, 40 parts of dioctyl phthalate and the commonly used stabilizing agents are mixed with the paste. The mixture is gelatinized on a roller mill for 10 minutes at 140–150° and the gel pressed in to film between polished metal plates heated to about 140°. The film is colored in a shade of greenish yellow which shows excellent fastness to light and migration.

Example 2

The filter cake of the monoazo dyestuff of the diazo compound of 22.1 parts of 1-amino-5-methyl-4-chlorobenzene-2-sulfonic acid and 27.2 parts of 1-acetoacetylamino-2.5-dimethoxy-4-chlorobenzene is suspended in 5000 parts of water. After neutralization, the suspension is heated to 95° and over the next 30 minutes a solution of 9 parts of anhydrous calcium chloride in 500 parts of water at 95° is added. The whole is maintained at 95° for a further 45 minutes, then the formed lake is filtered off and dried in vacuo at 60°. It dyes polyvinyl chloride yellow in the mass.

The monoazo dyestuff used as starting material is produced as follows: 22.1 parts of 1-amino-5-methyl-4-chlorobenzene-2-sulfonic acid are diazotized as described in Example 1. At the same time 27.2 parts of 1-acetoacetylamino-2.5-dimethoxy-4-chlorobenzene are dissolved in 400 parts of water and 15 parts of 30% caustic soda. After filtering to remove undissolved substance, a solution of 25 parts of soda in 100 parts of water and 100 parts of pyridine is added to the filtrate and the whole is cooled to 5°.

The diazo suspension is added to the solution of the coupling component at about 5° in the course of 2 hours. The mixture is agitated overnight and on the following day is heated to 60°, the precipitated monoazo dyestuff then being filtered off.

A nitrocellulose lacquer is produced as follows: 2 parts of the pigment dyestuff obtained as described in the first paragraph of the process of Example 2 are ground with 100 parts of a commercial nitrocellulose lacquer medium in a ball mill until a sample viewed in the microscope is found to contain no particles larger than 1$\mu$. The lacquer can be applied by a spraying or dipping technique to give coatings of good fastness to light and good resistance to top finishes and solvents.

Example 3

When the 9 parts of anhydrous calcium chloride used for the production of the lake in Example 1 are replaced by 25 parts of anhydrous lead nitrate or 11 parts of anhydrous manganese sulfate or 9 parts of anhydrous aluminum sulfate or 21 parts of crystallized ferrous sulfate or 14 parts of crystallized ferric chloride or 19 parts of crystallized cadmium or copper sulfate or 21 parts of crystallized nickel or cobalt sulfate or 9 parts of anhydrous magnesium sulfate or 10 parts of anhydrous zinc chloride or 18 parts of crystallized barium chloride or 20 parts of crystallized strontium chloride, color lakes are obtained with the same shade and the same excellent fastness properties as the calcium lake described in Example 1.

Example 4

When 18 parts of crystallized barium chloride are employed in place of the 9 parts of anhydrous calcium chloride of Example 2, a yellow barium lake is produced which is highly suitable for the mass pigmentation of cellulose acetate and triacetate.

A mixture of 100 parts of Cellit (secondary cellulose acetate with a content of 54–55% of splittable acetic acid), 400 parts of acetone and 1 part of the pigment dyestuff described in the present example is ground in a ball mill. Grinding is continued until the bulk of the particles in a film formed by pouring a sample on to glass is found to be not larger than 1$\mu$. The yellow shade of the spun filament is outstandingly fast to light and withstands all the normal treatments without loss of depth. It also shows very good fastness to washing, perspiration, gas fumes, cross dyeing, hydrosulfite, oxalic acid, peroxide bleaching, alkaline chlorine bleaching and dry cleaning.

Example 5

The filter cake of the monoazo dyestuff obtained by coupling the diazo compound of 22.3 parts of 2-aminonaphthalene-1-sulfonic acid with 27.2 parts of 1-acetoacetylamino-2.5-dimethoxy-4-chlorobenzene is suspended in 3000 parts of water in presence of 5 parts of a sulfonated fatty alcohol. The suspension is heated to 75° and in the course of 20 minutes a solution of 4 parts of anhydrous calcium chloride and 7 parts of crystallized barium chloride in 500 parts of water at 75° is added. The whole is agitated for a further hour at 85° C., then the color lake so formed is filtered off, washed with water and dried with vacuum at 60°.

The color lake dyes polyvinyl chloride in yellow shades which are fast to light and sublimation.

A printing ink is prepared in the following manner: 1 part of the pigment dyestuff described in the first paragraph of this example and 5 parts of aluminum hydrate are compounded with a suitable quantity of a linseed oil vehicle in a three-roller mill until a printing ink of the desired consistency is produced. The ink obtained in this way gives yellow prints on paper which have good fastness to light and overprinting.

In the following table further color lakes are listed which can be produced by the procedures described in the foregoing examples. They are characterized by the diazo and coupling components of the monoazo dyestuffs used for their production. The lakes produced with the metals Mg, Ca, Sr, Ni, Ba, Zn, Cd, Pb, Al, Co, Cu, Fe and Mn color polyvinyl chloride in greenish yellow shades of very good fastness to light and migration.

| Example No. | Diazo Component | Coupling Component | Metals for Lake Formation |
| --- | --- | --- | --- |
| 6 | 1-aminobenzene-2-carboxylic acid. | 1-acetoacetylamino-2.5-dimethoxy-4-chlorobenzene. | Mg, Sr, Ca, Ba, Zn, Pb, Mn, Cd. |
| 7 | 1-aminobenzene-3-carboxylic acid. | ___do___ | Mg, Sr, Ca, Ba, Zn, Pb, Mn, Cd. |
| 8 | 1-aminobenzene-4-carboxylic acid | ___do___ | Mg, Sr, Ca, Ba, Zn, Pb, Mn, Cd. |
| 9 | 1-aminobenzene-2-sulfonic acid. | ___do___ | Mg, Sr, Ca, Ba, Zn, Pb, Mn, Cd. |
| 10 | 1-aminobenzene-3-sulfonic acid. | ___do___ | Mg, Sr, Ca, Ba, Zn, Pb, Mn, Cd. |
| 11 | 1-aminobenzene-4-sulfonic acid. | ___do___ | Mg, Sr, Ca, Ba, Zn, Pb, Mn, Cd. |
| 12 | 1-amino-4-methyl-benzene-2-sulfonic acid. | ___do___ | Mg, Sr, Ca, Ba, Zn, Pb, Mn, Cd. |
| 13 | 1-amino-4-methyl-5-chlorobenzene-2-sulfonic acid. | ___do___ | Mg, Ca, Sr, Ba, Zn, Pb, Cd, Mn, Ni, Co, Al, Fe, Cu. |
| 14 | 1-amino-4.5-dichloro-benezene-2-sulfonic acid. | ___do___ | Mg, Ca, Sr, Ba, Zn, Pb, Cd, Mn, Ni, Co, Al, Fe, Cu. |
| 15 | 1-amino-2.5-dichloro-benezene-4-sulfonic acid. | ___do___ | Mg, Ca, Sr, Ba, Zn, Pb, Cd, Mn, Ni, Co, Al, Fe, Cu. |
| 16 | 1-aminonaphthalene-2-sulfonic acid. | ___do___ | Mg, Ca, Sr, Ba, Zn, Pb, Cd, Mn, Ni, Co, Al, Fe, Cu. |
| 17 | 1-aminobenzene-2-carboxylic acid. | 1-acetoacetylamino-2-methoxybenzene. | Ca, Ba, Pb, Mn, Zn. |
| 18 | 1-aminobenzene-3-carboxylic acid. | ___do___ | Ca, Ba, Pb, Mn, Zn. |
| 19 | 1-aminobenzene-4-carboxylic acid. | ___do___ | Ca, Ba, Pb, Mn, Zn. |
| 20 | 1-aminobenzene-2-sulfonic acid. | ___do___ | Ca, Ba, Pb, Mn, Zn. |
| 21 | 1-aminobenzene-3-sulfonic acid. | ___do___ | Ca, Ba, Pb, Mn, Zn. |
| 22 | 1-aminobenzene-4-sulfonic acid. | ___do___ | Ca, Ba, Pb, Mn, Zn. |
| 23 | 1-amino-4-methyl-benzene-2-sulfonic acid. | ___do___ | Ca, Ba, Pb, Mn, Zn. |
| 24 | 1-amino-4-methyl-5-chlorobenzene-2-sulfonic acid. | ___do___ | Ca, Ba, Pb, Mn, Zn. |
| 25 | 1-amino-4-chloro-5-methylbenzene-2-sulfonic acid. | ___do___ | Ca, Ba, Pb, Mn, Zn. |
| 26 | 1-amino 4.5-di-chloro-benzene-2-sulfonic acid. | ___do___ | Ca, Ba, Pb, Mn, Zn. |
| 27 | 1-amino-2.5-di-chloro-benzene-4-sulfonic acid. | ___do___ | Ca, Ba, Pb, Mn, Zn. |
| 28 | 2-aminonaphtha-lene-1-sulfonic acid. | ___do___ | Ca, Ba, Pb, Mn, Zn. |
| 29 | 1-aminobenzene-2-sulfonic acid. | 1-acetoacetylamino-naphthalene. | Mg, Ca, Cd, Ba, Pb, Mn. |
| 30 | ___do___ | 2-acetoacetylamino-naphthalene. | Mg, Ca, Cd, Ba, Pb, Mn. |
| 31 | ___do___ | 1-acetoacetylamino-benzene. | Ca, Sr, Ba, Pb, Mn, Zn, Al. |
| 32 | 1-amino-4-methyl-5-chlorobenzene-2-sulfonic acid. | ___do___ | Ca, Sr, Ba, Pb, Mn, Zn, Al. |
| 33 | ___do___ | 1-acetoacetylamino-naphthalene. | Ca, Ba, Pb, Mn, Zb, Ni. |
| 34 | ___do___ | 1-acetoacetylamino-4-chlorobenzene. | Ca, Ba, Pb, Mn, Zn, Ni. |
| 35 | ___do___ | 1-acetoacetylamino-benzene-2-carboxylic acid. | Ca, Ba, Pb, Mn, Zn, Ni. |
| 36 | 1-amino-2-methyl-4-chlorobenzene. | ___do___ | Ca, Ba, Pb, Mn, Zn, Ni. |
| 37 | ___do___ | 1-acetoacetylamino-benzene-4-sulfonic acid. | Ca, Ba, Pb, Mn, Zn, Ni. |
| 38 | 1-aminobenzene-2-sulfonic acid. | 1-benzoylacetyl-aminobenzene. | Ca, Ba, Pb, Mn, Zn, Ni. |
| 39 | 1-amino-4-methoxy-benzene-2-sulfonic acid. | ___do___ | Ca, Ba, Pb, Mn, Zn, Ni. |
| 40 | 1-amino-4-chloro-benzene-2-sulfonic acid. | 1-benzoylacetylami-nonaphthalene-4-sulfonic acid. | Ca, Ba, Pb, Mn, Zn, Ni. |
| 41 | 1-amino-2.4-dimeth-ylbenzene-6-sulfonic acid. | 1-acetoacetylamino-naphthalene-8-sulfonic acid. | Ca, Ba, Pb, Mn, Zn, Ni. |
| 42 | 1-aminonaphthal-ene-8-sulfonic acid. | 1-acetoacetylamino-2-chlorobenzene. | Ca, Ba, Pb, Mn, Zn, Ni. |

Having thus disclosed the invention what we claim is:

1. Color lakes of monoazo dyestuffs of the formula

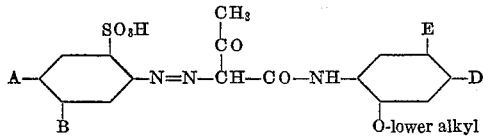

wherein each of A and B represents a member selected from the group consisting of hydrogen, chlorine, and methyl;

D represents a member selected from the group consisting of hydrogen, chlorine and bromine;

E represents a member selected from the group consisting of hydrogen, chlorine, bromine, lower alkyl and lower alkoxy; and the metals used for the lake formation being selected from the group consisting of an alkaline earth metal, aluminum, manganese, iron, cobalt, nickel, copper, zinc, cadmium and lead.

2. The yellow color lake consisting essentially of a water-insoluble metal compound of the monoazo dyestuff formed by coupling 1-diazo-4-methylbenzene-2-sulfonic acid with 1-acetoacetylamino-2.5-dimethoxy-4-chlorobenzene, the metal being a multivalent lake-forming metal selected from the group consisting of an alkaline earth metal, aluminum, manganese, iron, cobalt, nickel, copper, zinc, cadmium and lead.

3. A yellow color lake consisting essentially of a water-insoluble alkaline earth-metal salt of the monoazo dyestuff formed by coupling 1-diazo-5-methyl-4-chlorobenzene-2-sulfonic acid with 1-acetoacetylamino-2.5-dimethoxy-4-chlorobenzene.

4. A yellow color lake consisting essentially of a water-insoluble metal compound of the monoazo dyestuff formed by coupling 1-diazo-4-methyl-5-chlorobenzene-2-sulfonic acid with 1-acetoacetylamino-2.5-dimethoxy-4-chlorobenzene, the metal being a multivalent lake-forming metal selected from the group consisting of an alkaline earth metal, aluminum, manganese, iron, cobalt, nickel, copper, zinc, cadmium and lead.

5. A yellow color lake consisting essentially of the water-insoluble alkaline earth metal salts of the monoazo dyestuff formed by coupling 1-diazo-4-methyl-5-chloro-benzene-2-sulfonic acid with 1-acetoacetylamino-2.5-dimethoxy-4-chlorobenzene.

6. A yellow color lake consisting essentially of a water-insoluble metal compound of the monoazo dyestuff formed by coupling 1-diazo-4.5-dichlorobenzene-2-sulfonic acid with 1-acetoacetylamino-2.5-dimethoxy-4-chlorobenzene, the metal being a multivalent lake-forming metal selected from the group consisting of an alkaline earth metal, aluminum, manganese, iron, cobalt, nickel, copper, zinc, cadmium and lead.

7. A yellow color lake consisting essentially of a water-insoluble metal compound of the monoazo dyestuff formed by coupling 1-diazo-4-methyl-5-chlorobenzene-2-sulfonic acid with 1-acetoacetylamino-2-methoxybenzene, the metal being a multivalent lake-forming metal selected from the group consisting of an alkaline earth metal, aluminum, manganese, iron, cobalt, nickel, copper, zinc, cadmium and lead.

References Cited in the file of this patent

UNITED STATES PATENTS

| | | |
|---|---|---|
| 1,086,155 | Geldermann et al. | Feb. 3, 1914 |
| 1,126,413 | Desamari | Jan. 26, 1915 |
| 1,788,299 | Huismann et al. | Jan. 6, 1931 |
| 2,092,796 | Black | Sept. 14, 1937 |
| 2,203,038 | Zitscher et al. | June 4, 1940 |
| 2,229,049 | Dahlen et al. | Jan. 21, 1941 |
| 2,626,255 | Blumenthal | Jan. 20, 1953 |

FOREIGN PATENTS

| | | |
|---|---|---|
| 575,787 | Germany | May 3, 1933 |

OTHER REFERENCES

Geigy: German application Ser. No. G16457 IV b/22a, printed August 30, 1956, Kl. 22a1 (pages 1 and 2 relied upon).